US011697721B2

(12) United States Patent
Tateishi et al.

(10) Patent No.: US 11,697,721 B2
(45) Date of Patent: Jul. 11, 2023

(54) METHOD FOR PRODUCING RESIN MOLDED ARTICLE AND SHOE SOLE MEMBER

(71) Applicant: ASICS CORPORATION, Kobe (JP)

(72) Inventors: Junichiro Tateishi, Kobe (JP); Takashi Yamade, Kobe (JP); Daisuke Sawada, Kobe (JP); Takashi Osaki, Kobe (JP); Kenichi Harano, Kobe (JP)

(73) Assignee: ASICS CORPORATION, Kobe (JP)

( * ) Notice: Subject to any disclaimer, the term of this patent is extended or adjusted under 35 U.S.C. 154(b) by 413 days.

(21) Appl. No.: 16/966,518

(22) PCT Filed: Jan. 31, 2018

(86) PCT No.: PCT/JP2018/003231
§ 371 (c)(1),
(2) Date: Jul. 31, 2020

(87) PCT Pub. No.: WO2019/150493
PCT Pub. Date: Aug. 8, 2019

(65) Prior Publication Data
US 2021/0087352 A1 Mar. 25, 2021

(51) Int. Cl.
C08J 9/35 (2006.01)
C08L 53/02 (2006.01)
C08L 75/04 (2006.01)
B29C 44/44 (2006.01)
B29D 35/12 (2010.01)
C08J 9/00 (2006.01)
B29K 25/00 (2006.01)
B29K 75/00 (2006.01)
B29K 105/00 (2006.01)
B29K 475/00 (2006.01)

(52) U.S. Cl.
CPC ............... C08J 9/35 (2013.01); B29C 44/445 (2013.01); B29D 35/122 (2013.01); C08J 9/0061 (2013.01); C08L 53/02 (2013.01); C08L 75/04 (2013.01); B29K 2025/06 (2013.01); B29K 2075/00 (2013.01); B29K 2105/0061 (2013.01); B29K 2475/00 (2013.01); C08J 2353/02 (2013.01); C08J 2375/04 (2013.01); C08J 2423/00 (2013.01); C08J 2475/04 (2013.01); C08L 2203/14 (2013.01); C08L 2205/025 (2013.01)

(58) Field of Classification Search
CPC ........ C08J 9/35; C08J 9/0061; C08J 2353/02; C08J 2375/04; C08J 2423/00; C08J 2475/04; B29C 44/445; B29C 39/24; B29C 67/20; B29D 35/122; C08L 53/02; C08L 75/04; C08L 2203/14; C08L 2205/025; B29K 2025/06; B29K 2075/00; B29K 2105/0061; B29K 2475/00; B29K 2023/00; B29L 2031/504
See application file for complete search history.

(56) References Cited

U.S. PATENT DOCUMENTS

| 3,836,617 | A  | * | 9/1974 | Lankheet | C08J 9/22 |
|           |    |   |        |          | 264/45.3  |
| 6,358,459 | B1 |   | 3/2002 | Ziegler et al. | |
| 2010/0047550 | A1 | | 2/2010 | Prissok et al. | |
| 2014/0007456 | A1 | | 1/2014 | Tadin | |
| 2014/0151918 | A1 | | 6/2014 | Hartmann | |
| 2014/0223673 | A1 | | 8/2014 | Wardlaw et al. | |
| 2014/0223776 | A1 | | 8/2014 | Wardlaw et al. | |
| 2014/0259329 | A1 | | 9/2014 | Watkins et al. | |
| 2015/0252163 | A1 | | 9/2015 | Prissok et al. | |
| 2016/0227876 | A1 | | 8/2016 | Le et al. | |
| 2017/0036377 | A1 | | 2/2017 | Baghdadi et al. | |
| 2017/0072599 | A1 | | 3/2017 | Huang et al. | |
| 2017/0095987 | A1 | | 4/2017 | Feng et al. | |
| 2017/0318901 | A1 | | 11/2017 | Nishi | |
| 2017/0341326 | A1 | | 11/2017 | Holmes et al. | |
| 2019/0291371 | A1 | | 9/2019 | Wardlaw et al. | |
| 2020/0032022 | A1 | | 1/2020 | Prissok et al. | |
| 2020/0221820 | A1 | | 7/2020 | Le et al. | |

FOREIGN PATENT DOCUMENTS

| CN | 101583656 A | 11/2009 |
| CN | 105121528 A | 12/2015 |
| CN | 105856483 A | 8/2016 |
| CN | 106560303 A | 4/2017 |
| EP | 2 786 670 A1 | 10/2014 |
| GB | 1082277 A | 9/1967 |
| JP | S49-47401 Y1 | 12/1974 |
| JP | H08-038211 A | 2/1996 |

(Continued)

OTHER PUBLICATIONS

International Search Report issued in PCT/JP2018/003229; dated Mar. 13, 2018.
International Search Report issued in PCT/JP2018/003230; dated Mar. 6, 2018.
International Search Report issued in PCT/JP2018/003231; dated May 1, 2018.
Notification of Transmillal of Translation of the International Preliminary Report on Patentability and English Translation of the International Preliminary report on patentability (chapter II), PCT/JP2018/003231, dated Aug. 6, 2020.
The extended European search report issued by the European Patent Office dated Mar. 3, 2021, which corresponds to European Patent Application No. 18903771.6-1005 and is related to U.S. Appl. No. 16/966,518.

(Continued)

Primary Examiner — Irina S Zemel
(74) Attorney, Agent, or Firm — Studebaker & Brackett PC

(57) ABSTRACT

Provided is a method for producing a resin molded article including an introducing step of introducing a plurality of resin foam particles and a heat medium substance into a forming mold, and a molding step of, after the introducing step, heating the forming mold to a temperature at which the heat medium substance can be vaporized, thereby obtaining a resin molded article including the plurality of resin foam particles.

16 Claims, 1 Drawing Sheet

(56) References Cited

FOREIGN PATENT DOCUMENTS

| | | | |
|---|---|---|---|
| JP | H08-238111 A | 9/1996 |
| JP | H08-290432 A | 11/1996 |
| JP | H9-272161 A | 10/1997 |
| JP | H10-179364 A | 7/1998 |
| JP | H11-10743 A | 1/1999 |
| JP | 2000-135101 A | 5/2000 |
| JP | 2000-246849 A | 9/2000 |
| JP | 2006-137032 A | 6/2006 |
| JP | 2013-220354 A | 10/2013 |
| JP | 2014-151202 A | 8/2014 |
| JP | 2014-151210 A | 8/2014 |
| JP | 2014-521418 A | 8/2014 |
| JP | 2014-158708 A | 9/2014 |
| JP | 2015-51258 A | 3/2015 |
| JP | 2015-513354 A | 5/2015 |
| JP | 2016-141153 A | 8/2016 |
| JP | 2017-61143 A | 3/2017 |
| JP | 2018-12326 A | 1/2018 |
| KR | 20-0342160 Y1 | 2/2004 |
| WO | 2016/076432 A1 | 5/2016 |

OTHER PUBLICATIONS

An Office Action mailed by China National Intellectual Property Administration dated Apr. 14, 2021, which corresponds to Chinese Patent Application No. 201880088225.3 and is related to U.S. Appl. No. 16/966,518; with English language translation.

The extended European search report issued by the European Patent Office dated Apr. 6, 2021, which corresponds to European Patent Application No. 18903652.8-1017 and is related to U.S. Appl. No. 16/966,518.

The extended European search report issued by the European Patent Office dated Mar. 3, 2021, which corresponds to European Patent Application No. 18903513.2-1005 and is related to U.S. Appl. No. 16/966,518.

An Office Action mailed by China National Intellectual Property Administration dated Sep. 30, 2021, which corresponds to Chinese Patent Application No. 201880088245.0 and is related to U.S. Appl. No. 16/966,518 with English language translation.

An Office Action mailed by China National Intellectual Property Administration dated Jun. 2, 2021 which corresponds to Chinese Patent Application No. 201880088244.6 and is related to U.S. Appl. No. 16/966,518 with English language translation.

An Office Action mailed by China National Intellectual Property Administration dated Feb. 23, 2022, which corresponds to Chinese Patent Application No. 201880088245.0 and is related to U.S. Appl. No. 16/966,518; with English language translation.

Communication pursuant to Article 94(3) EPC issued by the European Patent Office dated Feb. 24, 2022, which corresponds to European Patent Application No. 18903652.8-1017 and is related to U.S. Appl. No. 16/966,518.

Communication pursuant to Article 94(3) EPC issued by the European Patent Office dated Feb. 14, 2023, which corresponds to European Patent Application No. 18903652.8-1014 and is related to U.S. Appl. No. 16/966,518.

* cited by examiner

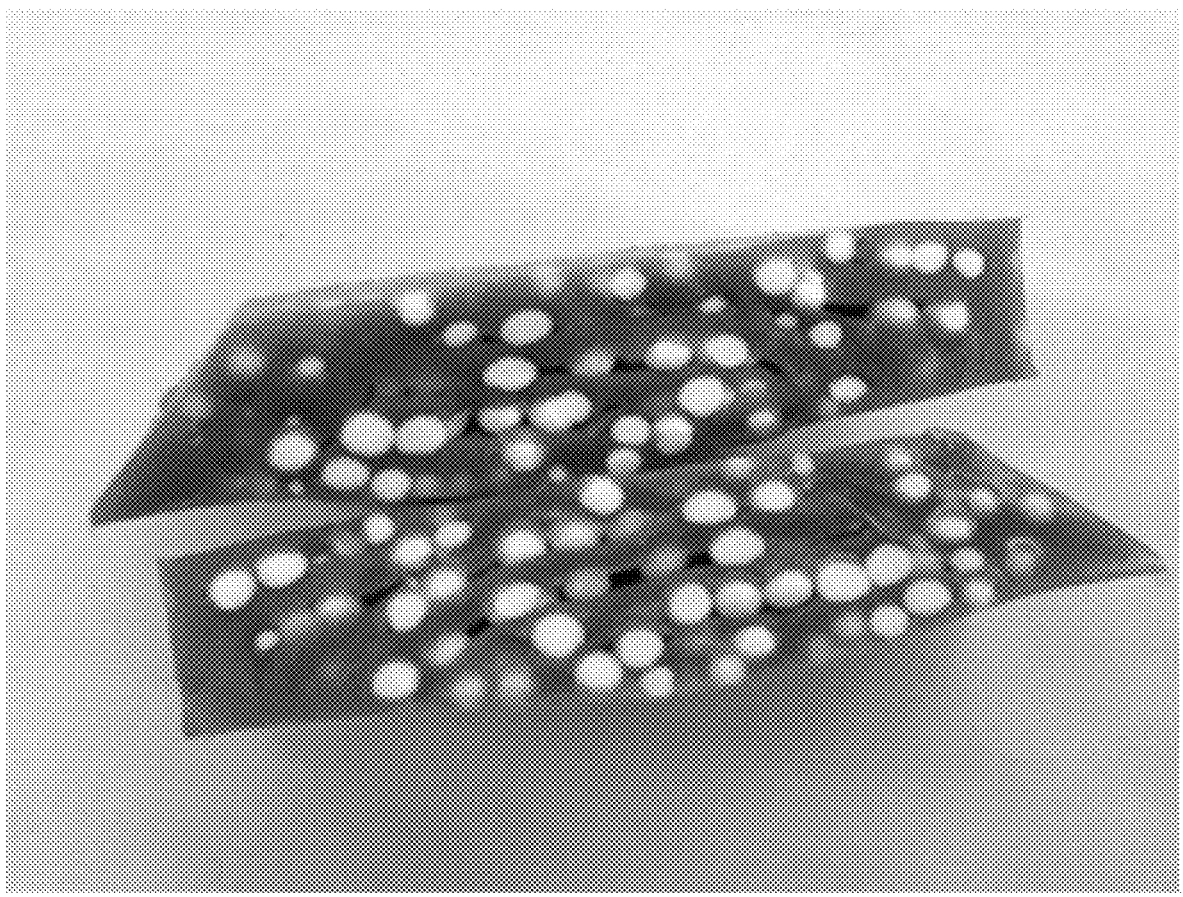

METHOD FOR PRODUCING RESIN MOLDED ARTICLE AND SHOE SOLE MEMBER

FIELD

The present invention relates to a method for producing a resin molded article and a shoe sole member, and more particularly, to a method for producing a resin molded article including a plurality of resin foam particles, and a method for producing a shoe sole member including the method for producing the resin molded article.

BACKGROUND

Conventionally, resin foam products formed by welding a plurality of resin foam particles made of polystyrene, polyurethane, or the like have been known as a resin molded article. Such resin foam products are excellent in shock absorbing properties, heat insulation performance, and sound absorbing properties, and therefore can be used for various applications requiring such performances. For example, Patent Literatures 1 to 3 disclose shoe sole members composed of a resin foam product. For shoe sole members required to have excellent cushioning performance, the cushioning properties of the shoe sole members can be effectively enhanced in the shoe sole members using the resin foam product.

The resin foam product is generally produced by introducing a plurality of resin foam particles into a forming mold, followed by heating and welding the plurality of resin foam particles in the forming mold. Here, as one of the methods for heating a plurality of resin foam particles in a forming mold, a method including heating the forming mold to transfer the heat to the plurality of resin foam particles via the forming mold is conceivable. However, the resin foam particles have a characteristic feature of high heat insulation performance, that is, making it hard to transfer the heat, which causes a problem that the heat is hardly transferred to a portion of the resin foam particles located away from the surface of the forming mold in the forming mold when this method is used.

In order to avoid such a problem, a method including feeding high-temperature steam from the outside into the forming mold to thereby heat the plurality of resin foam particles is known as a method for heating a plurality of resin foam particles in a forming mold, as described in Patent Literatures 1 to 3. However, the use of this method requires an additional facility for feeding steam into the forming mold from the outside, which increases the production cost of the resin foam product. Further, the forming mold into which a plurality of resin foam particles are introduced must be provided with a steam inlet for feeding steam from the outside, which causes another problem that the design freedom of the forming mold is reduced. Moreover, the resin composition constituting the resin foam particles may enter the steam inlet due to the pressure generated in the forming mold at the time of molding, which causes still another problem that a projection corresponding to the steam inlet is formed on the surface of the thus produced resin foam product.

CITATION LIST

Patent Literature

Patent Literature 1: JP 2014-521418 T
Patent Literature 2: JP 2013-220354 A
Patent Literature 3: JP 2014-151210 A

SUMMARY

Technical Problem

In view of the aforementioned problem, it is an object of the present invention to provide a method for producing a resin molded article enabling relatively uniform heat transfer in a forming mold in a simple way at the time of molding a resin molded article including a plurality of resin foam particles, and a method for producing a shoe sole member including the method for producing the resin molded article.

Solution to Problem

The present inventors have found that the above problem can be solved by preliminarily introducing a substance, which is vaporized by heating and thereby acts as a heat medium, into a forming mold at the time of heat-molding of a resin molded article including a plurality of resin foam particles.

That is, a method for producing a resin molded article according to the present invention includes: an introducing step of introducing a plurality of resin foam particles and a heat medium substance into a forming mold; and a molding step of, after the introducing step, heating the forming mold to a temperature at which the heat medium substance can be vaporized, thereby obtaining a resin molded article including the plurality of resin foam particles.

In the method for producing a resin molded article according to the present invention, the heat medium substance is preferably water.

In one form of the method for producing a resin molded article according to the present invention, a thermoplastic resin composition is additionally introduced into the forming mold in the introducing step.

In the above one form of the method for producing a resin molded article according to the present invention, for example, the thermoplastic resin composition includes a polyolefin-based resin or a polystyrene-based resin, and the plurality of resin foam particles are composed of a resin composition including a polyolefin-based resin.

In the above one form of the method for producing a resin molded article according to the present invention, for example, the thermoplastic resin composition includes a polyurethane-based resin, and the plurality of resin foam particles are composed of a resin composition including a polyurethane-based resin.

A method for producing a shoe sole member according to the present invention includes the aforementioned method for producing the resin molded article.

BRIEF DESCRIPTION OF DRAWINGS

FIG. 1 is a photograph showing a cross section of a resin composite produced by a method of Comparative Example.

DESCRIPTION OF EMBODIMENTS

Hereinafter, an embodiment of a method for producing a resin molded article and a member for a shoe of the present invention will be described. The following embodiments are shown merely as examples. The present invention is not limited to the following embodiments at all.

First Embodiment

The method for producing a resin molded article in the first embodiment of the present invention includes: an introducing step of introducing a plurality of resin foam particles and a heat medium substance into a forming mold; and a molding step of, after the introducing step, heating the forming mold to a temperature at which the heat medium substance can be vaporized, thereby obtaining a resin molded article including the plurality of resin foam particles.

In this embodiment, first, a plurality of resin foam particles are prepared before the introducing step. In this description, the resin foam particles mean foam particles composed of a resin composition and having a plurality of voids in the resin composition. The plurality of resin foam particles may be composed of any resin composition capable of being made into resin foam particles. For example, the resin composition may include a resin, such as polyolefin such as polyethylene (PE) or polypropylene (PP), thermoplastic polyurethane (TPU), polystyrene (PS), ethylene-propylene rubber (EPDM), polyether block amide (PEBA), polyesters (PEs), vinyl ethylene acetate (EVA), polyamide (PA), or the like.

Preferably, the resin composition may include a thermoplastic resin such as a polyolefin-based resin, a polystyrene-based resin or a thermoplastic polyurethane-based resin. In the case where the resin composition is a polyolefin-based resin, the polyolefin-based resin may be, for example, low density polyethylene, medium density polyethylene, ethylene-alpha olefin copolymer, ethylene-propylene rubber, polypropylene, ethylene-vinyl acetate, ethylene-acrylic acid copolymer, or the like, and an elastomer including an ethylene crystal phase as a hard segment is preferable. More specifically, the polyolefin-based resin is preferably an elastomer constituted by polymer chains each of which has an ethylene crystal phase(s) at one end or both ends thereof, or a block copolymer having ethylene crystal phases and ethylene-alpha olefin copolymerized portions arranged alternately. In the case where the resin composition is a polystyrene-based resin, the polystyrene-based resin may be, for example, a styrene-ethylene-butylene-styrene block copolymer (SEBS), a styrene-butadiene-butylene-styrene block copolymer (SBBS), a hydrogenated polystyrene-poly(styrene-butadiene)-polystyrene (SSEBS), a styrene-butylene-styrene block copolymer (SBS), a styrene-isoprene block copolymer (SIS), a styrene-ethylene-propylene-styrene block copolymer (SEPS), or the like, and SEBS, SSEBS, or SIS is more preferable. In the case where the resin composition is a thermoplastic polyurethane-based resin, the thermoplastic polyurethane-based resin may be, for example, polyether-based polyurethane, polyester-based polyurethane, or the like, and polyether polyurethane is more preferable.

The resin composition may further include a thermoplastic polyamide-based resin. The polyamide-based resin may be preferably a polyether block amide (PEBA) constituted by a hard segment composed of a polyamide unit and a soft segment composed of a polyether unit. The polyamide units constituting the hard segment may be, for example, polyamide 6, polyamide 66, polyamide 11, polyamide 12, polyamide 610, polyamide 612, or the like, and polyamide 11 or polyamide 12 is more preferable. These polyamide units may be individually used, or two or more of them may be used in combination. The polyether units constituting the soft segment may be, for example, polyethylene ether glycol, polypropylene ether glycol, polytetramethylene ether glycol, polyhexamethylene ether glycol, or the like, and polytetramethylene ether glycol is more preferable. These kinds of polyether units may be individually used, or two or more of them may be used in combination.

The resin composition may be a thermosetting resin. The thermosetting resin is not particularly limited, but preferably a thermosetting polyurethane-based elastomer, an acrylic elastomer, crosslinked rubber, a silicone-based elastomer, and a fluorine-based elastomer, and a urethane-based elastomer is preferable.

These resins may be individually used, or two or more of them may be used in combination.

The elastic modulus of the resin composition is not particularly limited, but for example, the initial elastic modulus at 23° C. may be 10 MPa or more and 400 MPa or less. In this description, the elastic modulus (Young's modulus) of each of various materials and members, such as the resin composition, refers to a compressive elastic modulus at 23° C. Measurement of the compressive elastic modulus can be performed, for example, by the method described in Examples to be described later. As the value of the elastic modulus, the value of a storage elastic modulus at 23° C. obtained by measurement at a frequency of 10 Hz in the measurement mode of "tensile mode of a sinusoidal strain", based on JIS K 7244-4: 1999 (equivalent to ISO 6721-4: 1994) can be used. For example, the storage elastic modulus can be measured using "Rheogel-E4000", a dynamic viscoelasticity measurement instrument manufactured by UBM as a measurement instrument, under the following conditions:

Measurement mode: Tensile mode of a sinusoidal strain
Frequency: 10 Hz
Distance between chucks: 20 mm
Load: Automatic static load
Dynamic strain: 5 µm
Heating rate: 2° C./min
Test piece: Strip shape having a length of 33±3 mm, a width of 5±1 mm, and a thickness of 2±1 mm The resin composition may include any other component, and may further include chemicals such as pigments, antioxidants, and ultraviolet absorbers.

The plurality of resin foam particles can be made from the resin composition using a conventionally known method. Specifically, the resin foam particles may be made by, for example, an impregnation method in which resin particles free from foaming agents are made, followed by impregnation of the resin particles with a foaming agent, or an extrusion method in which the resin composition including a foaming agent is extruded into cooling water for granulation. In the impregnation method, the resin composition is first molded to make resin particles. Next, the resin particles, a foaming agent, and an aqueous dispersant are introduced into an autoclave, followed by stirring under heat and pressure, to impregnate the resin particles with the foaming agent. The impregnated foaming agent is caused to foam to obtain the resin foam particles. In the extrusion method, for example, the resin composition and a foaming agent are added into an extruder equipped with a die having many small holes at its end, followed by melt-kneading. The molten-kneaded product is extruded from the die into the form of strands and thereafter is immediately introduced into cooling water to be cured. The thus obtained cured material is cut into a specific length to obtain the resin foam particles.

The foaming agent used in the aforementioned methods is not particularly limited and may be, for example, a chemical foaming agent or a physical foaming agent. The chemical foaming agent is a foaming agent that generates a gas by chemical reaction or thermal decomposition. Examples of the chemical foaming agent include inorganic chemical foaming agents such as sodium bicarbonate and ammonium carbonate, and organic chemical foaming agents such as azodicarbonamide. The physical foaming agent is, for example, a liquefied gas or a supercritical fluid, and is foamed by pressure reduction or heating. Examples of the physical foaming agent include aliphatic hydrocarbons such as butane, alicyclic hydrocarbons such as cyclobutane, and inorganic gases such as carbon dioxide gas, nitrogen, and air.

In this embodiment, in order to make the resin foam particles, an impregnation method using a supercritical fluid for foaming the resin composition is particularly preferably used. In this case, the resin composition can be dissolved in the supercritical fluid at a comparatively low temperature, and therefore the need for a high temperature for melting the resin composition is eliminated. This is particularly advantageous when the resin composition includes a resin with a high melting point, such as a polyamide elastomer. Further, the method is advantageous also in that generation of toxic gases due to foaming of a chemical foaming agent is suppressed since no chemical foaming agent is used.

The density and the expansion ratio of the plurality of resin foam particles are not particularly limited.

The shape and the size of the plurality of resin foam particles are not particularly limited. The shape of the resin foam particles is preferably spherical. In this case, the volume-average particle size D50 (median diameter) of the resin foam particles may be preferably in a diameter range of 1 to 20 mm, more preferably in a diameter range of 2 to 10 mm. In this description, the particle size of the resin foam particles means a value obtained by measuring the long diameter of each of the particles using a microscope.

The initial elastic modulus of the resin foam particles is not particularly limited, but the initial elastic modulus at 23° C. of the resin foam particles is preferably 0.2 MPa or more and 20 MPa or less, more preferably 0.3 MPa or more and 10 MPa or less, when the resin molded article molded in the subsequent molding step is a member for forming a shoe sole member. In this case, the initial stiffness and the amount of strain of the resin composite can be set to values more suitable for the shoe sole member. The initial elastic modulus of the resin foam particles included in the resin composite can be measured by, for example, the method in Examples to be described later.

Next, the plurality of resin foam particles and the heat medium substance are introduced into the forming mold in the introducing step. The heat medium substance is a substance that is vaporized by heating in the subsequent molding step and acting as a heat medium in a vapor state. Examples of such a heat medium substance include water and an organic substance such as a hydrocarbon-based material. Among them, the heat medium substance is preferably water that is easily vaporized under heat molding, unlikely to cause adverse effects on the resin foam particles, and has almost no effect on the human body and the environment. The heat medium substance may be liquid or solid at a temperature at which the introducing step is performed (for example, room temperature), as long as the heat medium substance has a boiling point or a sublimation point equal to or lower than the heating temperature in the subsequent molding step.

In the introducing step of this embodiment, a binder may be further used as appropriate in addition to the plurality of resin foam particles and the heat medium substance, so that the plurality of resin foam particles are integrated together in the subsequent molding step. Examples of the binder include a binder such as a surface modifier and urethane other than the resin composition constituting the resin foam particles. These binders may be individually used, or two or more of them may be used in combination.

In the molding step subsequent to the introducing step, the forming mold into which the plurality of resin foam particles and the heat medium substance have been introduced is heated to a temperature at which the heat medium substance can be vaporized. Thus, in this embodiment, a resin foam product in which the plurality of resin foam particles are integrated together can be obtained as a resin molded article by thermally fusing the plurality of resin foam particles to each other and thereby integrating them together. In the molding step of this embodiment, when the plurality of resin foam particles are heated to be integrated together, the heat medium substance is vaporized in the forming mold to have steam of the heated heat medium substance spreading throughout the forming mold. This configuration enables relatively uniform heat transfer throughout the plurality of resin foam particles in the forming mold (i.e., not only to the resin foam particles located near the inner surface of the forming mold but also to the resin particles located at and around the center of the forming mold away from the inner surface of the forming mold) via the vaporized heat medium substance.

The heating temperature in the molding step is not particularly limited as long as it enables the heat medium substance to be vaporized. However, the heating temperature is preferably such a temperature at which the plurality of resin foam particles are stable in terms of shape and chemical aspects. That is, the heating temperature is preferably in a range of −60° C. to +40° C. relative to the melting point or the softening point of the resin composition constituting the plurality of resin foam particles. The heating temperature is appropriately adjusted depending on the kind of the heat medium substance and the resin composition constituting the plurality of resin foam particles. For example, when the heat medium substance is water and the resin composition includes a polyolefin-based resin, the heating temperature may be in the range of 100 to 160° C. When the heat medium substance is water and the resin composition includes PEBA, the heating temperature may be in the range of 100 to 180° C.

In the molding step, in addition to heating, pressure may be appropriately applied to the forming mold. For example, a pressure of 1 to 30 MPa may be applied in the molding step.

According to the method of this embodiment, a resin foam product in which the plurality of resin foam particles are integrated together as a resin molded article can be produced in a simple way by heating the plurality of resin foam particles and the heat medium substance. Further, according to this method, the plurality of resin foam particles are entirely subjected to relatively uniform heating, which enables to obtain a resin foam product having the resin particles relatively firmly adhered to each other from the surface to the inside of the obtained resin foam product.

The resin foam product (resin molded article) produced by the method of this embodiment are excellent in, for example, shock absorbing properties, heat insulation performance and sound absorbing properties, and therefore can be used for various applications requiring such performances. For example, the resin foam product can be used for a part or the entire of a shoe sole member, a container, a cushioning material, a heat insulation material, or a sound absorbing material. The resin foam product can be preferably used as a material that forms part or all of a shoe sole member. The shoe sole member may be, for example, a member that forms part or all of an insole, a midsole or an outer sole. More preferably, the resin foam product may be a member that forms part or all of a midsole as a shoe sole member.

The method of this embodiment may be included in a method for producing members or parts in relation to the intended use, for example, may be included in a method for producing a shoe sole member. In this case, the member entirely formed of the resin foam product may be directly produced in the molding step using a forming mold having an internal shape corresponding to the shape of the member (for example, a shoe sole member).

In this embodiment, when resin foam particles of plural kinds having different particle diameters or different stiffness are introduced into a forming mold in the introducing step, these resin foam particles may be positioned in different areas in the forming mold according to the particle diameter or the stiffness. For example, in the case where the resin foam product is used for a shoe sole member, the resin foam particles having a small particle diameter may be arranged at a place of the forming mold which serves as the medial side of the foot after molding, or the resin foam particles having a large particle diameter may be arranged at the place of the forming mold which serves as the medial side of the foot after molding.

The resin foam particles thus arranged in the introducing step are integrated together in the subsequent molding step, to become a resin foam product in which the arrangement of the resin foam particles in the resin foam product is adjusted. By thus adjusting the arrangement of the resin foam particles in the resin foam product according to the particle diameter or the stiffness of the resin foam particles, the resin foam product having different stiffnesses according to the respective areas can be formed.

Second Embodiment

Next, the second embodiment of the present invention will be described. The method for producing the resin composite of the second embodiment of the present invention is the same as that of the first embodiment, except that a thermoplastic resin composition is further introduced into the forming mold in addition to the plurality of resin foam particles and the heat medium substance in the introducing step of the first embodiment.

The thermoplastic resin composition is not particularly limited, but includes, for example, a polystyrene-based resin, a polyolefin-based resin, or a thermoplastic polyurethane-based resin. These resin components may be selected from, for example, the aforementioned polystyrene-based resins, polyolefin-based resins or thermoplastic polyurethane-based resins which may be employed as the plurality of resin foam particles. These resin components may be individually used, or two or more of them may be used in combination.

As the resin component included in the thermoplastic resin composition, a polystyrene-based elastomer is preferably selected. In this case, the initial elastic modulus of the elastomer can be adjusted to an appropriate value by appropriately adjusting the content of the styrene component (styrene content) in the polystyrene-based elastomer. Thereby, the initial stiffness and the amount of strain of the shoe sole member can be adjusted to appropriate values.

The thermoplastic resin composition may further include a plasticizer. In this case, the thermoplastic resin composition may be a polymeric gel in which the resin included therein is gelled. The plasticizer may be, for example, paraffinic, naphthenic, aromatic, olefinic, or the like, with paraffinic being more preferred. In the case where the thermoplastic resin composition includes a plasticizer, the content of the plasticizer included in the thermoplastic resin composition is preferably 10 to 300% by weight of the entire thermoplastic resin composition.

The thermoplastic resin composition preferably includes a resin component having high weldability with the plurality of resin foam particles. In this case, the thermoplastic resin composition and the resin foam particles can be firmly adhered to each other in the subsequent molding step without using an adhesive element such as a binder. For example, in the case where the resin foam particles are composed of a polyolefin-based resin, the thermoplastic resin composition may include a polyolefin-based elastomer or a polystyrene-based elastomer. In the case where the resin foam particles are composed of a polyurethane-based resin, the thermoplastic resin composition may also include a polyurethane-based elastomer.

The thermoplastic resin composition preferably has sufficient fluidity at a temperature at which the resin composition constituting the plurality of resin foam particles is stable in terms of shape and chemical aspects. In this case, the plurality of resin foam particles can be dispersed in the thermoplastic resin composition in the subsequent molding step. For example, in the case where the resin composition constituting the plurality of resin foam particles also includes a thermoplastic resin, the thermoplastic resin composition preferably has sufficient fluidity at a temperature lower than the melting point or the softening point of the resin composition constituting the plurality of resin foam particles. Specifically, the thermoplastic resin composition preferably has a complex viscosity of 0.1 MPa·s or less at the aforementioned temperature. Here, in the case where the thermoplastic resin composition is a polyolefin-based elastomer, the complex viscosity at 100° C. of the polyolefin-based elastomer is preferably 0.05 MPa·s or less.

In this description, the complex viscosity of the resin composition refers to a value obtained by measurement at a frequency of 10 Hz in the measurement mode of "tensile mode of a sinusoidal strain", based on JIS K 7244-4: 1999 (equivalent to ISO 6721-4: 1994). For example, the complex viscosity of the resin composition can be measured under the conditions similar to those used in the aforementioned measurement method of the storage elastic modulus.

The thermoplastic resin composition may include any other component, and may further include chemicals such as pigments, antioxidants, and ultraviolet absorbers.

The initial elastic modulus of the thermoplastic resin composition is not particularly limited, but when the resin molded article molded in the subsequent molding step is a member forming a shoe sole member, preferably, the initial elastic modulus at 23° C. may be 0.1 MPa or more and 5 MPa or less, more preferably 0.2 MPa or more and 3 MPa or less, and still more preferably 3 MPa or less. In this case, the initial stiffness and the amount of strain of the resin composite can be set to values more suitable for the shoe sole member. When the initial elastic modulus of the elastomer at 23° C. is less than 0.1 MPa, the shoe sole member including the elastomer may have insufficient durability and mechanical strength. In the introducing step of this embodiment, the thermoplastic resin composition is mixed with the plurality of resin foam particles and introduced into the forming mold. The thermoplastic resin composition can preferably be formed into particles by a conventionally known method, and then mixed with the plurality of resin foam particles. The shape and the size of the thermoplastic resin composition formed into particles are not particularly limited. The method for mixing the thermoplastic resin composition with the plurality of resin foam particles is not particularly limited, and the thermoplastic resin composition can be mixed with the plurality of resin foam particles by any method.

Further, in the introducing step of this embodiment, various resin composites having a wide range of physical properties can be produced in the subsequent molding step by appropriately adjusting the mixing ratio between the thermoplastic resin composition and the plurality of resin foam particles, depending on the physical properties (such as initial stiffness and amount of strain) required for the produced resin molded article. For example, the introduced amount of the thermoplastic resin composition may be 5 to 90% (volume ratio) based on the total amount of the thermoplastic resin composition and the resin foam particles. In this case, the weight of the resin composite can be appropriately reduced and the elastic recovery of the resin composite can be appropriately increased.

In the subsequent molding step of this embodiment, the forming mold is heated to a temperature at which the heat medium substance can be vaporized in the same manner as the first embodiment.

In this embodiment, a resin composite in which the plurality of resin foam particles are dispersed in a matrix composed of the thermoplastic resin composition can be obtained as a resin molded article by heating in the molding step the heat medium substance to a temperature at which the heat medium substance can be vaporized and the thermoplastic resin composition exhibits sufficient fluidity.

The heating temperature is preferably not only the preferable heating temperature in the molding step of the first embodiment, but also the temperature at which the complex viscosity of the thermoplastic resin composition is 0 1 MPa·s or less. For example, in the case where the heat medium substance is water and both of the thermoplastic resin composition and the resin composition constituting the plurality of resin foam particles include a polyolefin-based resin, the heating temperature may be in a range of 100 to 160° C.

According to the method of this embodiment, the inside of the foaming mold is entirely subjected to relatively uniform heating, so that the thermoplastic resin composition having increased fluidity by heating can sufficiently flow inside of the foaming mold, and thus the thermoplastic resin composition can flow in between the plurality of resin foam particles. Thereby, according to the method of this embodiment, the resin composite in which the thermoplastic resin composition enters between the plurality of resin foam particles can be produced as a resin molded article in a simple way.

The resin composite (resin molded article) produced by the method of this embodiment is composed of two or more resin compositions including a resin composition constituting resin foam particles and the thermoplastic resin composition. The resin composite of this embodiment may have a domain composed of the thermoplastic resin composition in a matrix composed of the resin foam particles, and may have a domain composed of one or more of the resin foam particles in a matrix composed of the thermoplastic resin composition. That is, the resin composite of this embodiment may be formed of a resin foam product in which a plurality of the resin foam particles are directly adhered to each other to be integrated together, and the thermoplastic resin composition are filled in a plurality of voids formed inside the resin foam product, or may be formed of a plurality of the resin foam particles which are adhered to each other via the thermoplastic resin composition to be integrated together.

The resin composite produced by the method of this embodiment can also be used in various applications. For example, the resin composite can be used for a part or the entire of a shoe sole member, a sound absorbing material, a cushioning material, a vibration isolating material, or a vibration damping material. The resin composite is also preferably used as a material that forms a part or the entire of a shoe sole member such as an insole, a midsole or an outer sole, and more preferably a material that forms a part or the entire of the midsole. Compared with the conventional shoe sole member made of a resin foam product, the shoe sole member formed of the resin composite has a relatively small initial stiffness, a relatively large amount of strain during normal use and a relatively small amount of strain at a high load, is sufficiently light in weight as a shoe sole member, and has a relatively high elastic recovery. The shoe including the shoe sole member accordingly exhibits soft wearing feeling when the foot fits in the shoe, can suppress excessive deformation while having sufficient lightweight properties, can exhibit high cushioning properties, and is excellent in durability. Herein, the high-load state of the shoe sole member means the state where it is subjected to stress of approximately 0.6 to 1.0 MPa. The method of this embodiment may also be included by a method for producing a shoe sole member or the like.

In this embodiment, the resin composite may be produced by adjusting the mixing ratio between the plurality of resin foam particles and the thermoplastic resin composition depending on the physical properties required for the resin composite (for example, initial stiffness and amount of strain) independently for every given area in the introducing step, and then integrating them together in the subsequent molding step. For example, in the case where the shoe sole member is made of the resin composite and the thermoplastic resin composition is composed of an elastomer, the mixing ratio of the thermoplastic resin composition in areas of the shoe sole member that are likely to be subjected to a relatively large load, specifically, areas of a heel portion and a forefoot portion, may be higher than the mixing ratio of the thermoplastic resin composition in other areas. The heel portion of the shoe sole member having a large mixing ratio of the thermoplastic resin composition can effectively exhibit the shock absorbing effect due to the characteristics of the thermoplastic resin composition even in the case where the heel portion is subjected to a relatively large load when the wearer lands in the motion of various sports. In addition, the forefoot portion of the shoe sole member having a large mixing ratio of the thermoplastic resin composition suppresses excessive deformation of the shoe sole and thereby enables the wearer to smoothly transfer his or her body weight at the time of the wearer's cutting maneuvers. On the other hand, in an area of the shoe sole member that is less likely to be subjected to a relatively large load, the mixing ratio of the thermoplastic resin composition may be made smaller than the mixing ratio of the resin composition in other areas. For example, the midfoot portion of the shoe sole member, which is less likely to be subjected to a large load, may have a certain degree of cushioning properties. Thus, the area of the midfoot portion may have a small mixing ratio of the thermoplastic resin composition, thereby making it possible to reduce the weight of the shoe sole member. As described above, the mixing ratio between the plurality of resin foam particles and the thermoplastic resin composition is adjusted independently for every given area, so that the resin composite of which the initial stiffness and the amount of strain are different for every given area can be formed.

Further, steam can be entrained into the thermoplastic resin composition because the viscosity of the thermoplastic resin composition can be sufficiently decreased in the molding step. This also enables to bring the thermoplastic resin composition lied between the resin foam particles in the obtained resin composite into a micro-foamed state (a foamed state in which a volume ratio of air is lower than that of the resin foam particles).

As described above, the method for producing a resin molded article in each of the embodiments of the present invention includes an introducing step of introducing a plurality of resin foam particles and a heat medium substance into a forming mold; and a molding step of, after the introducing step, heating the forming mold to a temperature at which the heat medium substance can be vaporized, thereby obtaining a resin molded article including the plurality of resin foam particles. Thus, relatively uniform heat transfer inside the forming mold can be enabled in a simple way at the time of molding the resin molded article. Therefore, it is possible to produce a resin molded article molded by relatively uniform heating from the surface to the inside of the resin molded article.

According to the conventional method for producing a resin molded article, it is essential to use a forming mold having a steam inlet for introduction of steam, which poses a problem that a resin composition or the like constituting resin foam particles, which enters the steam inlet due to the pressure generated in the forming mold at the time of molding, and hence easily causes formation of a protrusion corresponding to the steam inlet on the surface of the resin molded article. This problem has been more serious especially in the case where the resin molded article is used for a shoe sole member such as a midsole and such a projection as described above is present on its adhesive surface with an outsole or an upper, a sufficiently excellent adhesion is less likely to be exhibited therebetween. On the other hand, the method for producing a resin molded article of this embodiment has an advantage of being capable of suppressing the formation of such a projection. As seen from the above, this production method enables to easily obtain a shoe sole member such as a midsole capable of exhibiting excellent adhesion with an outsole, an upper, or the like, and thus is particularly advantageous for producing a resin molded article forming a shoe sole member.

Further, when an additional thermoplastic resin composition to be lied between the resin foam particles is further introduced as in the second embodiment of the present invention, and a molding step is performed at a temperature at which the thermoplastic resin composition exhibits sufficient fluidity, the conventional method for producing a resin molded article may have a problem that the thermoplastic resin having increased fluidity flows out through the steam inlet. On the other hand, the forming mold without a steam inlet can be used in the molding step of the second embodiment of the present invention, and therefore the possibility that the thermoplastic resin composition flows out through the steam inlet can be suppressed. That is, this embodiment can provide a wide variety of options on the temperature conditions at the time of performing the molding step as compared with the case of using the forming mold having the steam inlet.

The method for producing a shoe sole member in each of the above embodiments of the present invention can produce a shoe sole member in which a part or the entire of the shoe sole member is formed by the resin molded article produced as described above.

Although detailed description beyond the above will not be repeated here, conventionally known technical matters on shoe sole members may be optionally employed in the present invention even if the matters are not directly described in the above.

EXAMPLES

Hereinafter, the present invention will be elucidated by way of specific examples and comparative examples of the present invention. However, the present invention is not limited to the following examples.
(Polymer Gel Material)
Styrene-ethylenebutylene-olefin crystallization copolymer ("DAYNARON4600P" manufactured by JSR Corporation: density of 0.91 g/cm$^3$, SEBC), olefin multi-block copolymer ("INFUSE9007" manufactured by the Dow Chemical Company: density of 0.87 g/cm$^3$, OBC), and paraffin oil as a plasticizer (density of 0.88 g/cm$^3$) were prepared to be SEBC:OBC:oil=50:50:120 (weight ratio). Subsequently, these materials were introduced into a commercially available twin-screw extruding kneader and mixed together at 120 to 200° C. to produce a polymer gel material with density of 0.88 g/cm$^3$ and Asker C hardness of 50 (instantaneous value). Thereafter, the polymer gel material was formed into a plurality of particles using a conventionally known method.
(Resin Foam Particles)
A polyolefin-based resin was used as a material for resin foam particles to produce resin foam particles with a density of 0.165 g/cm$^3$ (true density) and a particle diameter of D50=4.1 mm, using a conventionally known method.

Production of Resin Composite

Example

The resin foam particles produced in the manner as described above and a particulate polymer gel material were mixed to obtain a mixed particle material including them in a ratio of resin foam particles:polymer gel material=10:90 (weight ratio). Next, a cavity (having a flat plate shape with a width of 100 mm, a length of 100 mm and a height of 20 mm) of the forming mold was filled with the mixed particle material and 100 ml of water. Subsequently, the forming mold was hot pressed for 3 minutes at 160° C. under pressure by a heat press machine, thereby integrating the resin foam particulates and the polymer gel material together, to form a resin composite having the same shape and dimensions of the cavity (with a density of 0.74 g/cm$^3$ and Asker C hardness of 50 (instantaneous value)). Thereafter, the forming mold was cooled with cold water for 10 minutes, and then the resin composite was taken out of the cavity of the forming mold.

Comparative Example

A resin composite having the same shape and dimensions as those of the cavity was formed a method similar to that for Example, except that no water was added when the cavity of the forming mold was filled with the mixed particle material.
(Evaluation)
Each of the resin composites produced by the methods of Example and Comparative Example was cut in the thickness direction at a position where the length of the resin composite was roughly divided into two equal portions, followed by observation of its cross section.

According to this observation, the resin foam particles were scattered in a gel matrix in which the polymer gel was a continuous body as a whole in each of the resin composites produced by the methods of Example and Comparative example. At this time, in each of the cross sections, a gel matrix is lied between each adjacent resin foam particles, and few portions at which the resin foam particles were directly welded to each other were present.

However, in the cross section of the resin composite produced by the method of Comparative Example, a crack-like large void was observed near the center of the gel matrix as shown in FIG. 1. It is assumed that this was caused by that the polymer gel positioned near the center in the cavity away from the surface of the forming mold did not sufficiently exhibit the fluidity due to the insufficient heat transfer over the inside of the cavity of the forming mold during the hot pressing.

On the other hand, in the resin composite produced by the method of Example, a state in which the resin foam particles were scattered in a dense gel matrix was observed, while such a void was not confirmed. It is assumed that this is because heat relatively uniformly transfers in the cavity of the forming mold due to the spread of the heated steam in the cavity of the mold during the hot pressing enabling.

The invention claimed is:

1. A method for producing a resin molded article, comprising:
   introducing a plurality of resin foam particles, a thermoplastic resin composition, and a heat medium substance into a forming mold; and
   after the introducing, a molding process of heating the plurality of resin foam particles and the thermoplastic resin composition by heating the forming mold to a temperature at which the heat medium substance can be vaporized to allow the heat medium substance to vaporize in the forming mold, thereby obtaining a resin molded article that is a resin composite in which the plurality of resin foam particles are dispersed in a matrix composed of the thermoplastic resin composition,
   wherein
      the thermoplastic resin composition comprises a polyolefin-based resin or a polystyrene-based resin, and
      the plurality of resin foam particles are composed of a resin composition comprising a polyolefin-based resin.

2. The method for producing a resin molded article according to claim 1, wherein the heat medium substance is water.

3. A method for producing a resin molded article, comprising:
   introducing a plurality of resin foam particles, a thermoplastic resin composition, and a heat medium substance into a forming mold; and
   after the introducing, a molding process of heating the plurality of resin foam particles and the thermoplastic resin composition by heating the forming mold to a temperature at which the heat medium substance can be vaporized to allow the heat medium substance to vaporize in the forming mold, thereby obtaining a resin molded article that is a resin composite in which the plurality of resin foam particles are dispersed in a matrix composed of the thermoplastic resin composition, wherein
   the thermoplastic resin composition comprises a polyurethane-based resin, and
   the plurality of resin foam particles are composed of a resin composition comprising a polyurethane-based resin.

4. The method for producing a resin molded article according to claim 1, wherein the thermoplastic resin composition is a polymer gel.

5. The method for producing a resin molded article according to claim 1, wherein the thermoplastic resin composition constituting the matrix of the resin composite is a continuous body as a whole in the resin molded article.

6. The method for producing a resin molded article according to claim 2, wherein
   the thermoplastic resin composition comprises a polyolefin-based resin or a polystyrene-based resin, and
   the plurality of resin foam particles are composed of a resin composition comprising a polyolefin-based resin.

7. The method for producing a resin molded article according to claim 2, wherein
   the thermoplastic resin composition comprises a polyurethane-based resin, and
   the plurality of resin foam particles are composed of a resin composition comprising a polyurethane-based resin.

8. The method for producing a resin molded article according to claim 2, wherein the thermoplastic resin composition is a polymer gel.

9. The method for producing a resin molded article according to claim 3, wherein the thermoplastic resin composition is a polymer gel.

10. The method for producing a resin molded article according to claim 2, wherein the thermoplastic resin composition constituting the matrix of the resin composite is a continuous body as a whole in the moldingresin molded article.

11. The method for producing a resin molded article according to claim 3, wherein the thermoplastic resin composition constituting the matrix of the resin composite is a continuous body as a whole in the resin molded article.

12. A method for producing a shoe sole member comprising the method according to claim 1, wherein the forming mold is a mold for a shoe sole member.

13. A method for producing a shoe sole member comprising the method according to claim 2, wherein the forming mold is a mold for a shoe sole member.

14. A method for producing a shoe sole member comprising the method according to claim 3, wherein the forming mold is a mold for a shoe sole member.

15. A method for producing a shoe sole member comprising the method according to claim 4, wherein the forming mold is a mold for a shoe sole member.

16. A method for producing a shoe sole member comprising the method according to claim 5, wherein the forming mold is a mold for a shoe sole member.

* * * * *